United States Patent
Hovén

(10) Patent No.: US 11,661,993 B2
(45) Date of Patent: May 30, 2023

(54) SHOCK ABSORBER AND METHOD FOR CONTROLLING A DAMPING FLOW IN A SHOCK ABSORBER

(71) Applicant: ÖHLINS RACING AB, Upplands Väsby (SE)

(72) Inventor: Arnold Hovén, Upplands Väsby (SE)

(73) Assignee: Öhlins Racing AB, Upplands Vasby (SE)

(*) Notice: Subject to any disclaimer, the term of this patent is extended or adjusted under 35 U.S.C. 154(b) by 262 days.

(21) Appl. No.: 17/051,705

(22) PCT Filed: May 7, 2019

(86) PCT No.: PCT/EP2019/061645
§ 371 (c)(1),
(2) Date: Oct. 29, 2020

(87) PCT Pub. No.: WO2019/219449
PCT Pub. Date: Nov. 21, 2019

(65) Prior Publication Data
US 2021/0239178 A1  Aug. 5, 2021

(30) Foreign Application Priority Data
May 14, 2018 (EP) .................................... 18171990

(51) Int. Cl.
*F16F 9/46* (2006.01)
*F16F 9/06* (2006.01)

(52) U.S. Cl.
CPC .............. *F16F 9/461* (2013.01); *F16F 9/062* (2013.01); *F16F 2230/18* (2013.01)

(58) Field of Classification Search
CPC .......... F16F 9/062; F16F 9/461; F16F 2230/18
See application file for complete search history.

(56) References Cited

U.S. PATENT DOCUMENTS

| | | | |
|---|---|---|---|
| 5,682,968 A | 11/1997 | Boichot et al. | |
| 7,607,522 B2 * | 10/2009 | Nygren | F16F 9/20 188/319.1 |

(Continued)

FOREIGN PATENT DOCUMENTS

| | | | | |
|---|---|---|---|---|
| DE | 4445705 A1 * | 6/1996 | ............... | F16F 9/46 |
| DE | 19540049 C1 * | 2/1997 | ............. | F16F 9/362 |

(Continued)

OTHER PUBLICATIONS

International Search Report and Written Opinion for PCT/EP2019/061645 dated Jul. 25, 2019.

*Primary Examiner* — Melody M Burch
(74) *Attorney, Agent, or Firm* — Öhlins Racing AB

(57) ABSTRACT

A shock absorber and method of controlling a shock absorber, wherein the shock absorber comprises damper body having an inner tube and an outer tube and a piston rod having a main piston arrangement arranged inside the inner tube. The shock absorber further comprises two separate electrical continuously controlled valves (CES1, CES2), one for compression and one for rebound flow, arranged with passive valves coupled in series with and downstream of the electronically controlled valves and with a communication chamber coupling these valves to a pressurizing chamber.

8 Claims, 7 Drawing Sheets

(56) References Cited

U.S. PATENT DOCUMENTS

| | | | |
|---|---|---|---|
| 2005/0061591 A1* | 3/2005 | Deferme | F16F 9/062 188/280 |
| 2006/0102440 A1 | 5/2006 | Nygren et al. | |
| 2008/0250844 A1 | 10/2008 | Gartner | |
| 2011/0042174 A1 | 2/2011 | Hamers et al. | |
| 2016/0160955 A1* | 6/2016 | Yu | F16F 9/065 188/269 |

FOREIGN PATENT DOCUMENTS

| | | | | |
|---|---|---|---|---|
| DE | 10260394 B3 * | 6/2004 | | F16F 9/062 |
| DE | 102010008723 A1 | 12/2010 | | |
| DE | 102016112794 A1 | 1/2017 | | |
| DE | 102016206595 A1 * | 10/2017 | | |
| EP | 1306574 A2 * | 5/2003 | | F16F 9/062 |
| EP | 1531066 A1 | 5/2005 | | |
| EP | 1820996 A2 | 8/2007 | | |
| EP | 1820996 A3 | 11/2007 | | |
| EP | 2410203 A2 * | 1/2012 | | B60G 13/06 |
| EP | 3309423 A1 | 4/2018 | | |
| WO | 2007097699 A1 | 8/2007 | | |
| WO | 2008079093 A1 | 7/2008 | | |

* cited by examiner

SHOCK ABSORBER AND METHOD FOR CONTROLLING A DAMPING FLOW IN A SHOCK ABSORBER

CROSS-REFERENCE TO RELATED APPLICATIONS

This application is a national stage of, and claims priority to, Patent Cooperation Treaty Application No. PCT/EP2019/061645, filed on May 7, 2019, which application claims priority to European Application No. EP 18171990.7, filed on May 14, 2018, which applications are hereby incorporated herein by reference in their entireties.

FIELD

The present specification generally relates to the field of shock absorbers used in vehicles and in particularly discloses a pressurized shock absorbing arrangement.

BACKGROUND

Shock absorbers and damping systems are used for damping of the relative movement between the wheel and the chassis of a vehicle, such as a car, a motorcycle or a bicycle. A conventional shock absorber normally comprises a working cylinder filled with a damping fluid, such as hydraulic oil or gas, and a piston arranged on a piston rod movably arranged in the cylinder. The piston is further commonly arranged to divide the cylinder into a first and second working chamber and moves in the cylinder against the resistance of the fluid, which in turn causes damping fluid to move in the damping cylinder. The shock absorber, or damper, may be arranged between the vehicle chassis and the wheel to move telescopically as the vehicle travels along such that the movement of the wheel and vehicle is thus damped by the piston moving in the cylinder against the resistance of the fluid.

Further, in order to improve the damping dynamics of a shock absorber, the damping fluid may be pressurized with a compressing pressure in order to improve the damping characteristics. However, there is a general need of improving the damping characteristics of a shock absorbers, as it can improve both driving safety, performance and comfort of a vehicle. Further, in order to implement the solutions on a wide range of vehicles there is a need for cost efficient solutions.

DETAILED DESCRIPTION

Figure 1:
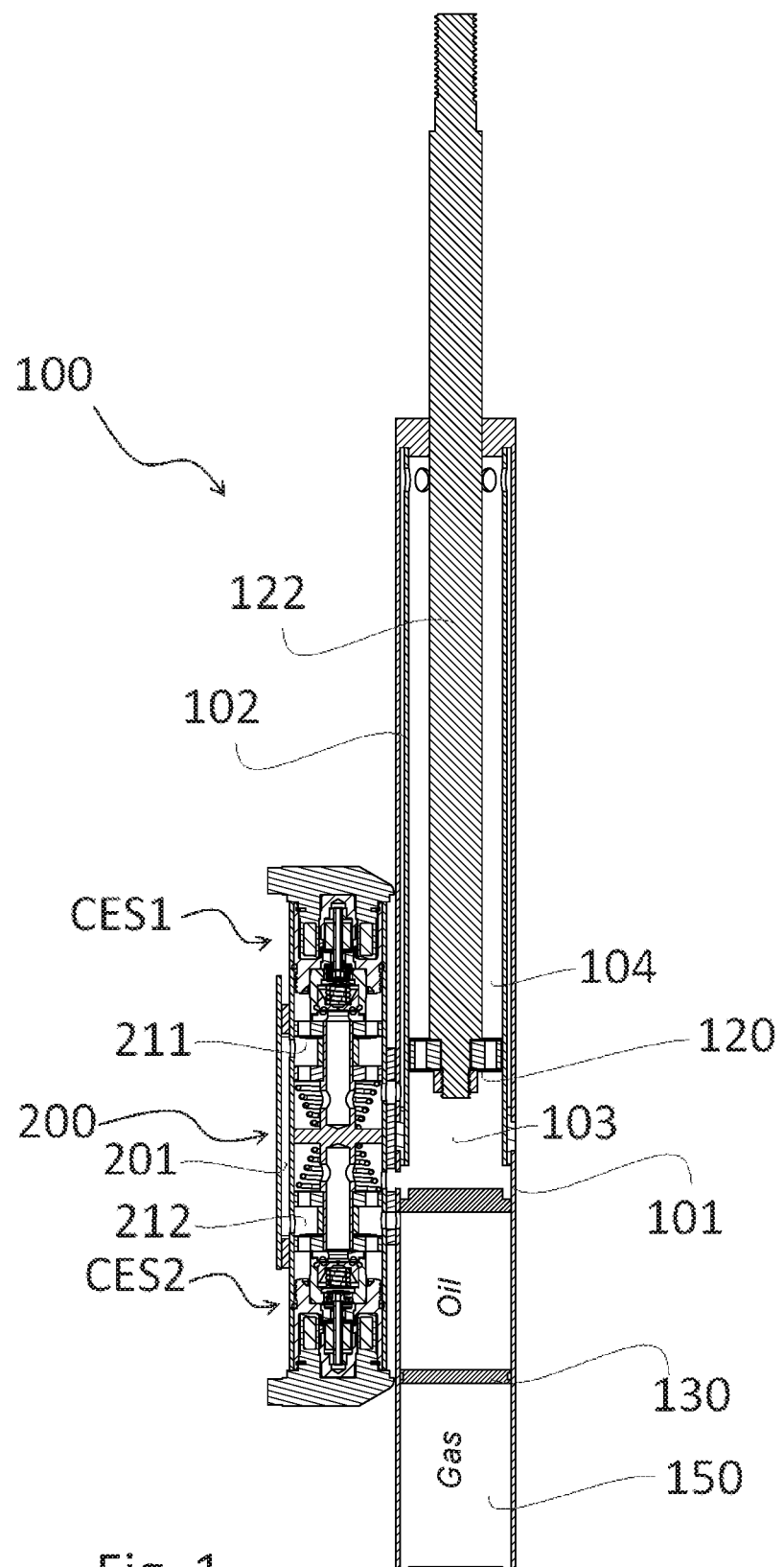
FIG. 1 shows a shock absorber in a cross-sectional view.

The disclosure provides a shock absorber with two separate electrical continuously controlled valves, one for compression and one for rebound flow, arranged with passive valve(s) coupled in series with and downstream of the electrical continuously controlled valves and with a communication chamber coupling these valves to a pressurizing chamber.

According to a first aspect of the disclosure this is achieved by a shock absorber for a vehicle, comprising a damper body having an outer tube and an inner tube wherein the inner tube is arranged at least partly inside the outer tube. The shock absorber further comprises a main piston arrangement arranged in the inner tube dividing the inner tube into a first volume and second volume and configured to regulate a damping fluid flow between the first and second volumes. Further it comprises a first electrical continuously controlled valve fluidly connected to the first volume of the inner tube and configured to control the damping fluid flow during a compression stroke, a second electrical continuously controlled valve fluidly connected to the second volume of the inner tube and configured to control the damping fluid flow during a rebound stroke, a fluid reservoir for holding a pressurized gas, comprising a pressurizing piston separating the pressurized gas from the damping fluid and exerting a pressure on the damping fluid. Further, the shock absorber comprises a communication member arranged to fluidly connect the pressurizing piston with the low-pressure side of each of the first and second electrical continuously controlled valves, a first passive regulating valve fluidly arranged between the pressurizing piston and one of the first or second electrical continuously controlled valves. Finally, the fluid reservoir is co-axially arranged relative the damper body.

Hereby, a cost-efficient shock absorber with advantageous damping character is achieved by using the communication member and the combination of electric continuously controlled valves with at least a passive valve. With this construction of the shock absorber, the first passive regulating valve is arranged downstream of the electrical continuously controlled valve and upstream of the pressurizing piston, allowing a control of the damping fluid pressuring to be lowered in two serial restrictions, wherein the first one is the active electric continuously controlled valve which may be adjusted by controlling the restriction based on a desired damping force at the specific moment, and thereafter further reducing the pressure before the damping fluid reaches the pressurizing piston by means of the first passive regulating valve. Further, by arranging the passive regulating valve downstream of the electric continuously controlled valve, the pressure over the electric continuously controlled valve is increased, which reduces the risk of gas bubbles occurring in the damping fluid. Further, the passive regulating valve may be used as a check valve to ensure flow of damping fluid in an undesired direction. Thereby, the passive regulating valve may be used for two functions, and thereby decreasing the number of components in the valve arrangement.

In the context of the application "fluidly coupled" should be understood as any coupling means such as a channel, pipe, hose or other fluid connection means. Moreover, in the context of the application, the wording that the pressurizing piston is "arranged, [ . . . ] inside said inner tube" comprise the different examples where the pressurizing piston may be arranged directly or indirectly in the inner tube, by being arranged inside one (or several) other components located inside the inner tube.

In one example, the shock absorber further comprises a second passive regulating valve arranged downstream of the other one of the first or second electronic continuously controlled valve and upstream of the pressurizing piston.

Hereby, each of the first and second passive regulating valves are arranged downstream of the first and second electrical continuously controlled valves, respectively, and upstream of the pressurizing piston. This allows controlling the damping fluid in both compression and rebound stroke by the means of the above mentioned two serial restrictions, i.e. first an active electric continuously controlled valve and thereafter a passive regulating valve.

The passive regulating valves may be a shim valve comprising a single shim or several shims in a stack. In other examples, the passive regulating valves may be a disc preloaded by a spring or a shim spring.

According to one example, the damping fluid is a liquid such as damping oil, and the pressurized fluid is a gas, such as air, nitrogen, $CO_2$.

In further one example, the first electrical continuously controlled valve and the second electrical continuously controlled valve are arranged in an active valve housing being radially displaced relative the damper body.

Hereby, the total length of the shock absorber may be decreased (as opposed to when they are arranged in the axial extension of the shock absorber), which may be beneficial when mounting the shock absorber in a vehicle, since it will require less axial length.

In further one example, the communication member comprises a fluid communication chamber extending along the longitudinal extension of the active valve housing, so as to fluidly connect the first electrical continuously controlled valve, the second electrical continuously controlled valve and the pressurizing piston. Hereby, the desired flow of damping fluid may be achieved in a cost- and space efficient way.

In one example, the fluid communication chamber is arranged on a side of the active valve housing facing away from the main damper body. Hereby, the heavier electrical continuously controlled valves may be placed closer to the shock absorbers center axis, decreasing the stress on the construction since a shorter distance, acting as a force lever, between the main damper body and the active valve housing is enabled.

In further one example, the fluid communication chamber is arranged externally of the main damper body. Hereby, assembly of the fluid communication chamber is facilitated. In one example, the fluid communication chamber of is made of a die cast part or stamped sheet metal.

According to a further aspect of the disclosure, the above-mentioned objectives may be achieved by an alternative shock absorber for a vehicle, comprising a damper body having an outer tube and an inner tube wherein the inner tube is arranged at least partly inside the outer tube. The shock absorber further comprises a main piston arrangement arranged in the inner tube dividing the inner tube into a first volume and second volume and configured to regulate a damping fluid flow between the first and second volumes. Moreover, the shock absorber comprises a first electrical continuously controlled valve fluidly connected to the first volume of the inner tube and configured to control the damping fluid flow during a compression stroke and further comprises a second electrical continuously controlled valve fluidly connected to the second volume of the inner tube and configured to control the damping fluid flow during a rebound stroke. Moreover, the shock absorber comprises a fluid reservoir for holding a pressurized gas, comprising a pressurizing piston separating the pressurized gas from the damping fluid and exerting a pressure on the damping fluid. The shock absorber further comprises a communication member arranged to fluidly connect the pressurizing piston with the low-pressure side of each of the first and second electrical continuously controlled valves. Finally, the shock absorber comprises a first passive regulating valve fluidly arranged between the pressurizing piston and one of the first or second electrical continuously controlled valves, and wherein the fluid reservoir is radially displaced relative the damper body.

Hereby, advantages being analogous to those described in relation to the first described shock absorber may be achieved. That is, a cost-efficient shock absorber with advantageous damping character may be achieved by using the communication member and the combination of electric continuously controlled valves with at least one passive valve. Further, having the first passive regulating valve arranged downstream of the electrical continuously controlled valve and upstream of the pressurizing piston allows a control of the damping fluid pressuring to be lowered in two serial restrictions, and as already discussed it has the advantages of reducing risk of gas bubbles occurring in the damping fluid. Moreover, this example also allows the total length of the shock absorber to be decreased as the fluid reservoir is radially displaced relative the active valve housing allowing the reservoir to be arranged with an axial overlap relative the extension of the damper body.

In the context of this application, the wording A is "fluidly arranged between" X and Y should be read as that the placing of object A is between object X and object Y, in the fluid path running between X and Y. Thus, object A does not need to be "fluidly arranged" as in floating.

In one example, the shock absorber further comprises a second passive regulating valve arranged downstream of the other one of the first or second electronic continuously controlled valve and upstream of the pressurizing piston. Hereby, each of the first and second passive regulating valves are arranged downstream of the first and second electrical continuously controlled valves, respectively, and upstream of the pressurizing piston. This allows controlling the damping fluid in both compression and rebound stroke by the means of the above mentioned two serial restrictions, i.e. first an active electric continuously controlled valve and thereafter a passive regulating valve.

In further one example, the first electrical continuously controlled valve and the second electrical continuously controlled valve are arranged in an active valve housing being radially displaced relative the damper body. Hereby, the total length of the shock absorber may be decreased (as opposed to when they are arranged in the axial extension of the shock absorber), which may be beneficial when mounting the shock absorber in a vehicle, since it will require less axial length.

In further one example, the communication member is arranged as a connecting member arranged between the fluid reservoir and the active valve housing.

In further one example, the communication member comprises an aperture extending along the longitudinal extension of the active valve housing, so as to fluidly connect the first electrical continuously controlled valve, the second electrical continuously controlled valve and the pressurizing piston.

Further, any compatible examples/features described in relation to the first described shock absorber may be implemented in the second described shock absorber.

According to a further aspect of the disclosure, the above-mentioned objects are achieved by a vehicle comprising a shock absorber, according to any of the examples mentioned in this application, for damping movements between a vehicle propulsion means (such as a wheel, runner, drive belt/tracks etc.) and the vehicle's chassis.

According to a further aspect of the disclosure, the above-mentioned objects are achieved by a method for controlling the damping flow of a shock absorber, comprising the steps of: during a compression stroke routing a compression flow of damping fluid from a first volume of an inner tube in a shock absorber to a first electrical continuously controlled valve, decreasing the compression flow pressure by means of said first electrical continuously controlled valve, routing said compression flow further to a first passive restricting valve, arranged in series with said first electrical continuously controlled valve, and finally decreasing said compression flow pressure by means of said first passive restricting valve, into a predefined low pressure level. The method further comprise the step of, during a compression stroke, routing a compression flow of damping fluid from a second volume of the inner tube in said shock absorber to a second electrical continuously controlled valve, decreasing the compression flow pressure by means of said second electrical continuously controlled valve, routing said compression flow further to a second passive restricting valve, arranged in series with said second electrical continuously controlled valve, and decreasing said compression flow pressure by means of said first passive restricting valve, into a predefined low pressure level. Further, in the method the predefined low pressure level is controlled by a pressurizing piston in a fluid reservoir.

Hereby, an efficient method may be applied to achieve an advantageous damping character by using the communication member and the combination of electric continuously controlled valves with at least a passive valve. With method, the first/second passive regulating valve is arranged downstream of the first/second electrical continuously controlled valve and upstream of the pressurizing piston, allowing a control of the damping fluid pressuring to be lowered in two serial restrictions, wherein the first one is the active electric continuously controlled valve which may be adjusted by controlling the restriction based on a desired damping force at the specific moment, and thereafter further reducing the pressure before the damping fluid reaches the pressurizing piston by means of the first passive regulating valve.

According to a further aspect of the disclosure, the above-mentioned objects are achieved by using two electrical continuously controlled valve arrangements for controlling a damping flow in a shock absorber. The use comprising using a first electrical continuously controlled valve for decreasing a compression flow pressure from a first volume of an inner tube and thereafter decreasing said compression flow pressure further by means of a first passive restricting valve, into a predefined low pressure level. Further, the use comprises using a second electrical continuously controlled valve for decreasing a rebound flow pressure from a second volume of an inner tube, decreasing said rebound flow pressure further by means of a second passive restricting valve, into the predefined low pressure level. Further the use of said first or second electronically controlled valve together with the first or second passive restricting valve allows said predefined low pressure level to be in the range of 0.1 to 2 MPa (MN/m$^2$), that is 100000 Pa-2000000 Pa. Hereby, as described above, a cost efficient shock absorber with advantageous damping character may be provided.

With reference to the Figures it is noted that all figures are schematic, not necessarily to scale, and generally only show parts which are necessary in order to elucidate the disclosure, wherein other parts may be omitted or merely suggested. Throughout the figures the same reference signs designate the same, or essentially the same features.

FIG. 1 shows a shock absorber 100 in a cross-sectional view. This figure is an overview and more details will be discussed in relation to FIGS. 2 and 3 which are close-ups of FIG. 1. The shock absorber 100 comprises a damper body having an outer tube 101 and an inner tube 102. The inner tube 102 is coaxially arranged with the outer tube 101. Inside the inner tube 102 a main piston arrangement 120 is movably arranged which divides the inner tube into two volumes; a first volume 103 illustrated below the piston arrangement and a second volume 104 illustrated above the piston arrangement. Each of the volumes are fluidly connected with intermediate valves, as discussed further below, to regulate the flow between the first and the second volumes.

The main piston arrangement 120 is connected at an end portion of a piston rod 122. The piston rod may be attached to a chassis portion of the vehicle, and so that the shock absorber may be used to absorb movements of the vehicle chassis relative a propulsion means, such as a wheel, drive belt or runner. Further, the figure illustrates an active valve housing 200 comprising a first and a second continuously controlled valve CES1, CES2, a first and a second passive regulating valve 211, 212 and a communication member 201 which fluidly connects the pressurizing piston with the low-pressure side of each of the first and second electrical continuously controlled valves. This will be further discussed in relation to close-ups in FIGS. 2 and 3.

Moreover, in FIG. 1 there is a fluid reservoir 150 which is formed to hold a pressurized gas. Moreover, a pressurizing piston 130 is arranged for separating the pressurized gas from the damping fluid and also to exert a pressure on the damping fluid. The pressurizing piston is configured to pressurize the damping fluid, whereby it comprises an axial first end portion facing the main piston arrangement 120 (upwards in the figure), and further comprising an axial opposite second end portion which is facing the fluid reservoir 150.

Figure 2:
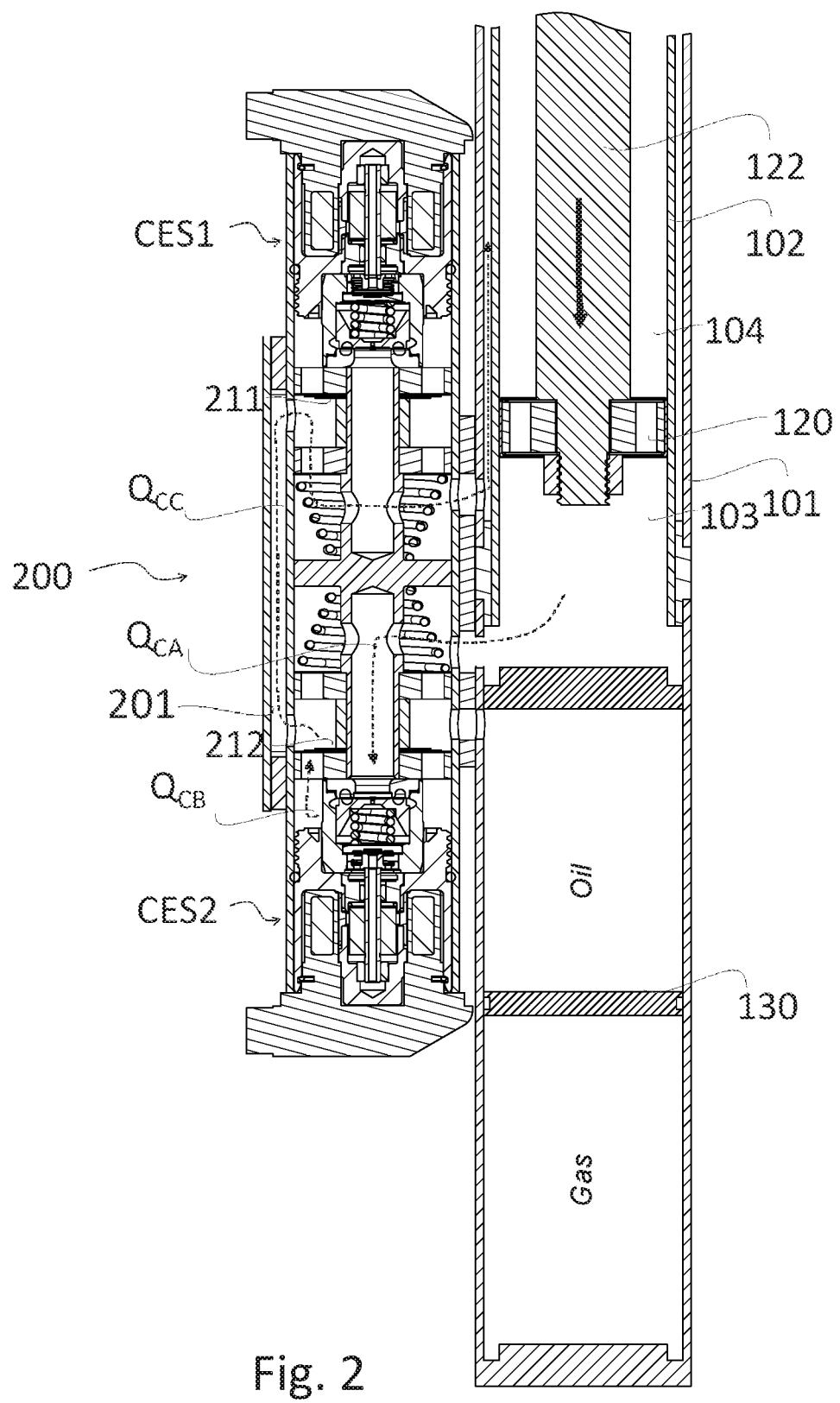
FIG. 2 shows a close-up of the cross-sectional view in FIG. 1 with a compression flow indicated with a dashed line.
Figure 3:
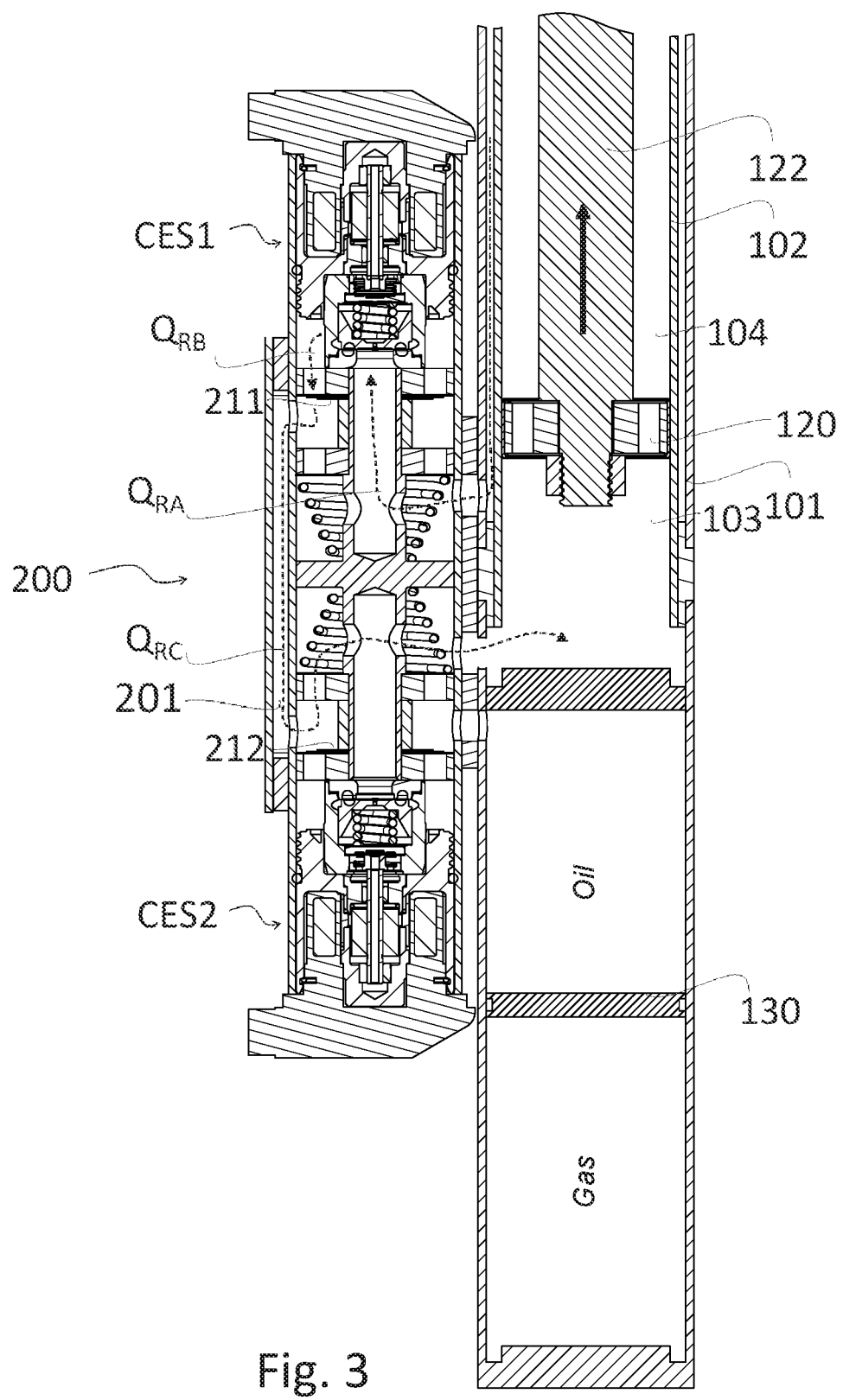
FIG. 3 shows the same close-up as in FIG. 2, but with a rebound flow indicated with a dashed line.

Moving on to FIGS. 2 and 3, showing a close-up of the cross-sectional view in FIG. 1 with a compression flow indicated with a dashed line in FIG. 2 and a rebound flow indicated with a dashed line in FIG. 3.

In FIG. 2, a compression stroke is illustrated in which the piston rod 122 moves downwards towards the fluid reservoir. During the compression stroke the damping fluid flows from the first volume 103 towards the second volume 104. The first compression flow path portion $Q_{CA}$ flows from the first volume 103 to the first electrical continuously controlled valve CES1, which lowers the pressure of the flow. Thereafter, the second compression flow path portion $Q_{CB}$ flows from the first electrical continuously controlled valve to the first passive regulating valve 212, which lowers the pressure of the flow even further. Finally, the third and last compression flow path portion $Q_{CC}$ flows from the first passive regulating valve through the communication member 201 and via the space between the inner tube 102 and the outer tube 101 onwards to the second volume 104 of the inner tube.

Further, as illustrated in FIG. 3, the rebound flow runs in an opposite direction, and partly along the same path, but instead of flowing via the first electrical continuously controlled valve CES1 and the first passive regulating valve 112 the rebound flow is regulated by means of the second electrical continuously controlled valve CES2 and the second passive regulating valve 211. Thus, during the rebound stroke the damping fluid flows from the second volume 104 towards the first volume 103. The first rebound flow path portion $Q_{RA}$ flows from the second volume 104 to the second electrical continuously controlled valve CES2, which lowers the pressure of the flow. Thereafter, the second rebound flow path portion $Q_{RB}$ flows from the second electrical continuously controlled valve CES2 to the second passive regulating valve 211, which lowers the pressure of the flow even further. Finally, the third and last rebound flow path portion $Q_{RC}$ flows from the second passive regulating valve through the communication member 201 to the first volume 103 of the inner tube.

In FIGS. 1-3 the fluid reservoir 150 is coaxially arranged relative the damper body. Moreover, the pressurizing piston 130 faces, at a first end, the damping fluid (upwards in the figure) and at the other end it faces a pressurizing gas in the fluid reservoir 150. Thus, the pressurizing piston is movable along the axial extension of the damper body in response to the pressure relation between in the fluid reservoir and the low pressure of the damping fluid which has been lowered by an electrical continuously controlled valve and a passive regulating valve, as explained above.

The electrical continuously controlled valves may be continuously controlled in response to an electrical signal controlling an actuator such as a solenoid or a stepping motor which controls the fluid flow through the valve.

Figure 4:
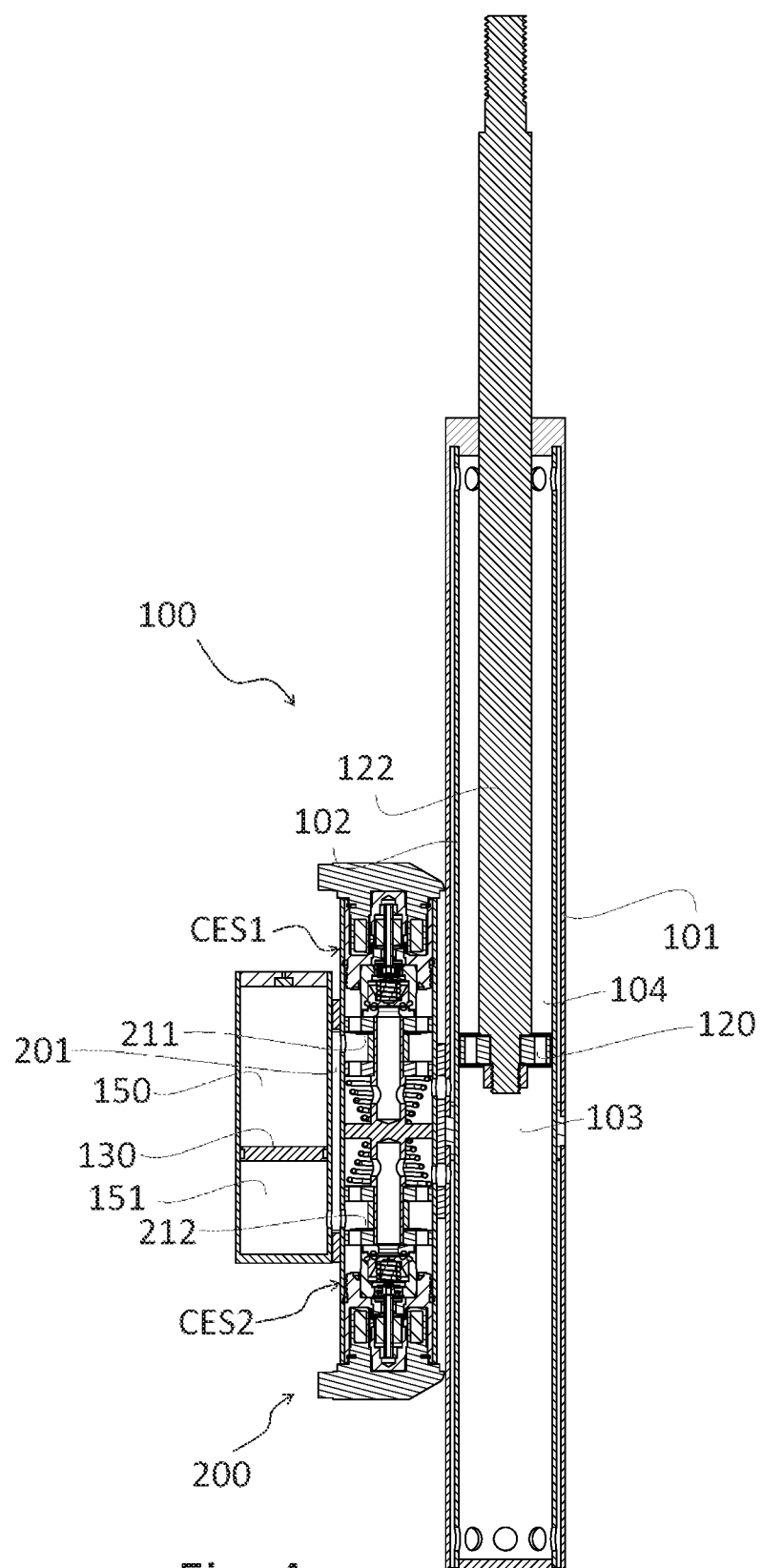
FIG. 4 shows an alternative example of a shock absorber, illustrated in a cross-sectional view.
Figure 5:
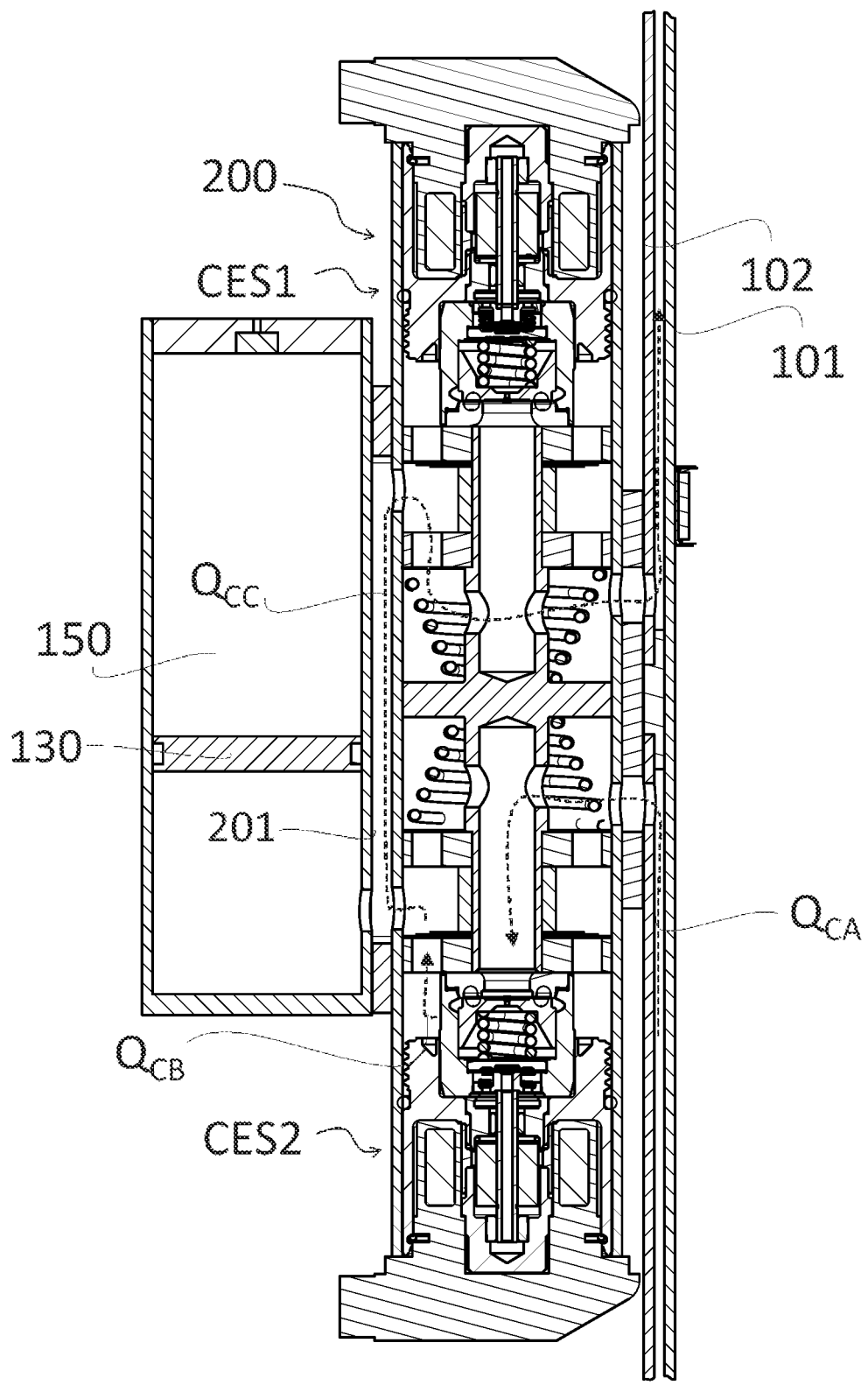
FIG. 5 shows a close-up of the cross-sectional view in FIG. 4 with a compression flow indicated with a dashed line.
Figure 6:
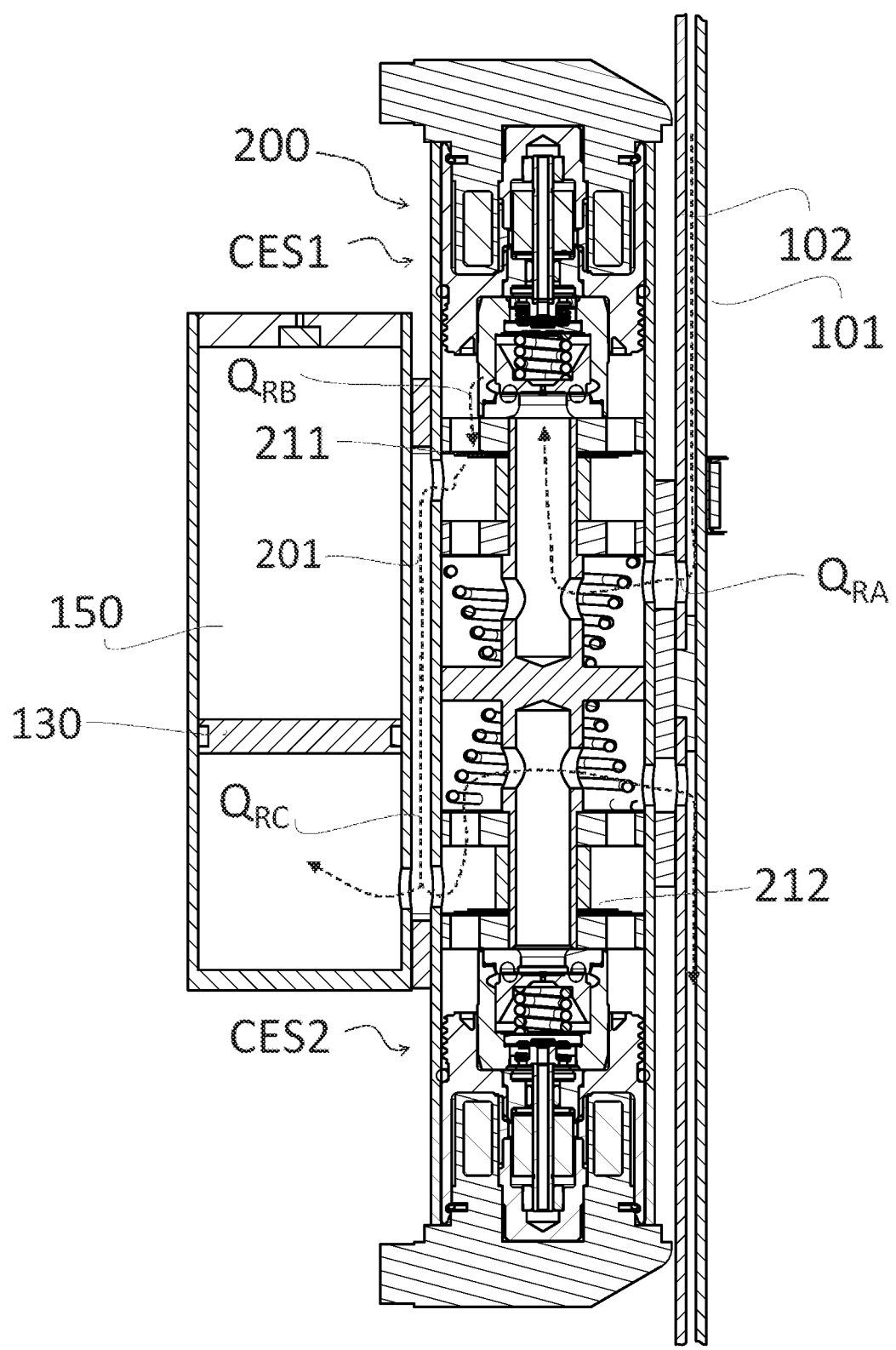
FIG. 6 shows the same close-up as in FIG. 5, but with a rebound flow indicated with a dashed line.

In FIGS. 4-6 an example where the fluid reservoir is radially displaced relative the active valve housing. FIG. 4 illustrates an overview, disclosing essentially the same features as in FIG. 1, why not all features will be discussed in detail again. Instead the described features in FIG. 1 are also applicable to FIG. 4, with the difference that the fluid reservoir is radially displaced relative the damper body instead of being coaxially arranged with the damper body. Thus, the shock absorber 100 also comprise a damper body having an outer tube 101 and an inner tube 102 being coaxially arranged. A similar main piston arrangement 120 divides the inner tube into the same two volumes; a first volume 103 below the piston arrangement and a second volume 104 above the piston arrangement. The main piston arrangement 120 may be solid, or at least closed so as not to let any fluid through it between the two volumes 103, 104. In another example, the main piston arrangement may comprise one or several valves, enabling a bypass fluid flow during the compression and/or the rebound flow, described in more detail below.

Further, FIGS. 4-6 illustrate an active valve housing 200 comprising the first and second continuously controlled valves CES1, CES2, first and second passive regulating valves 211, 212 and the communication member 201 fluidly connecting the pressurizing piston with the low-pressure side of each of the first and second electrical continuously controlled valves. Moreover, the shock absorber in FIG. 4 also comprise the fluid reservoir 150 which is formed to hold a pressurized gas. However, as mentioned above, the fluid reservoir is now arranged radially displaced relative the damper body. This means that the length of the shock absorber may be reduced.

Moving on to FIGS. 5 and 6, showing a close-up of the cross-sectional view in FIG. 4 with a compression flow indicated with a dashed line in FIG. 5 and a rebound flow indicated with a dashed line in FIG. 6.

In FIG. 5, a compression stroke, similar to the one in FIG. 2 is illustrated. The damping fluid in the illustrated compression flow still flows from the first volume 103 towards the second volume 104. Moreover, the flow still comprises three flow path portions. The first compression flow path portion $Q_{CA}$ flows from the first volume 103 to the first electrical continuously controlled valve CES1, which lowers the pressure of the flow. Thereafter, the second compression flow path portion $Q_{CB}$ flows from the first electrical continuously controlled valve to the first passive regulating valve, which lowers the pressure of the flow even further. Finally, the third and last compression flow path portion $Q_{CC}$ flows from the first passive regulating valve through the communication member 201 and via the space between the inner tube 102 and the outer tube 101 onwards to the second volume 104 of the inner tube. Moreover, the flow in the last flow path $Q_{CC}$ is in communicative connection with the pressurizing piston 130.

Further, as illustrated in FIG. 6, the rebound flow runs in an opposite direction, and partly along the same path, but instead of flowing via the first electrical continuously controlled valve CES1 and the first passive regulating valve 112 the rebound flow is regulated by means of the second electrical continuously controlled valve CES2 and the second passive regulating valve 211. Thus, during the rebound stroke the damping fluid flows from the second volume 104 towards the first volume 103. The first rebound flow path portion $Q_{RA}$ flows from the second volume 104 to the second electrical continuously controlled valve CES2, which lowers the pressure of the flow. Thereafter, the second rebound flow path portion $Q_{RB}$ flows from the second electrical continuously controlled valve CES1 to the second passive regulating valve 211, which lowers the pressure of the flow even further. Finally, the third and last rebound flow path portion $Q_{RC}$ flows from the second passive regulating valve through the communication member 201 to the pressurizing piston 130 and the first volume 103 of the inner tube 102.

Figure 7:
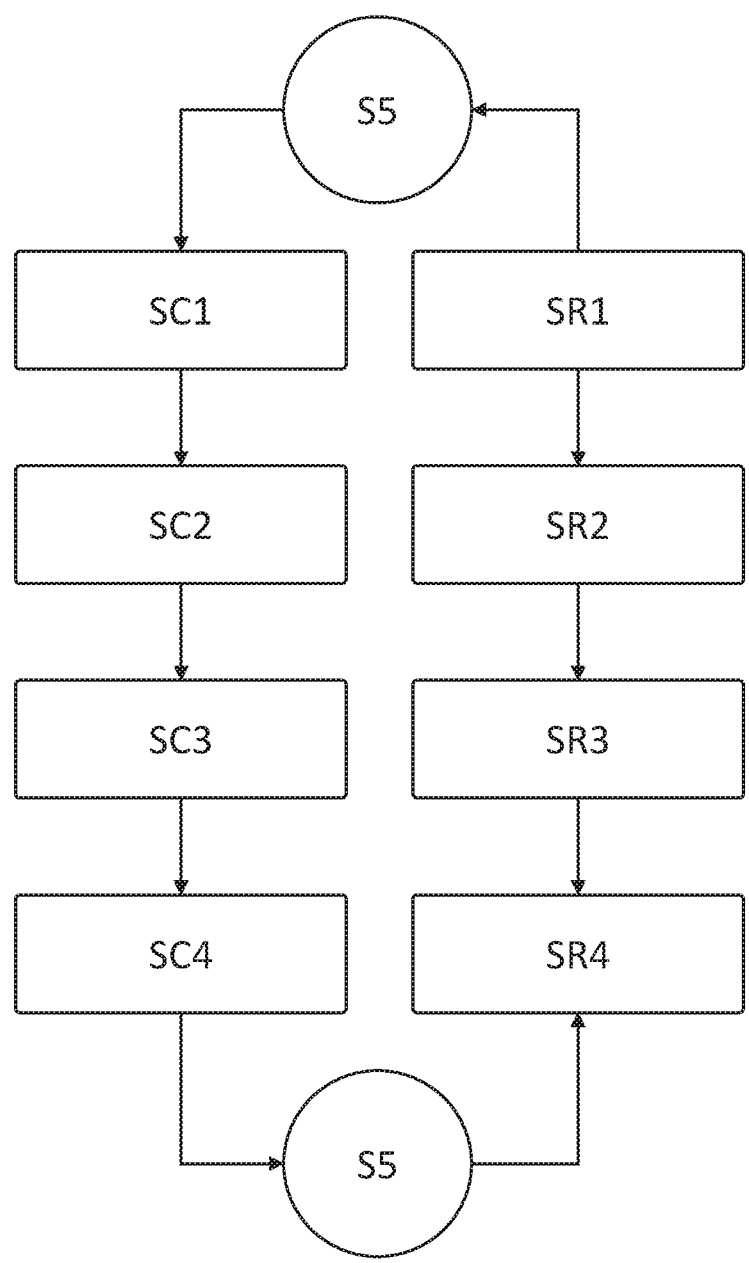
FIG. 7 shows a schematic view of a method of controlling a damping flow in a shock absorber.

Finally, FIG. 7 illustrates an example of the method for controlling the damping flow of a shock absorber. The four steps on the left hand side are the steps (SC1-SC4) carried out during compression stroke, and the steps on the right hand side are the steps (SR1-SR4) carried out during the rebound stroke. Further, between the compression and the rebound stroke, the fifth step S5 is carried out as described below. The method comprises the steps as essentially described in relation to the flow above. These steps are, during a rebound stroke, first routing SR1 a rebound flow of damping fluid from a second volume 104 of an inner tube 102 in a shock absorber to a second electrical continuously controlled valve CES2. Secondly, the rebound flow pressure is decreased SR2 by means of said second electrical continuously controlled valve CES2. Thereafter, the rebound flow is routed SR3 further to the second passive restricting valve 211 arranged in series with, and downstream of, said second electrical continuously controlled valve CES2. The fourth step during the rebound stroke is decreasing SR4 the rebound flow pressure by use of the second passive restricting valve 211, into a predefined low pressure level. Further, the predefined low pressure level is controlled S5 by a pressurizing piston in a fluid reservoir 150, which may be regulated by adjusting the pressure in the fluid reservoir 150. The predefined low pressure level may be in the range of 0.1 to 2 MPa (MN/m$^2$), that is 100000 Pa-2000000 Pa. The pressure may be in the range of 0.2 to 1.5 MPa, or even in the range of 0.4 to 1 MPa.

Further, the method as illustrated in FIG. 7, during a compression stroke, comprises the step of routing SC1 the compression flow of damping fluid from the first volume 103 of the inner tube 102 in said shock absorber to a first electrical continuously controlled valve CES1. Secondly, the step of decreasing SC2 the compression flow pressure by means of said first electrical continuously controlled valve CES1 is carried out. Thirdly, the method comprises the step of routing SC3 the compression flow further to the first passive restricting valve 212, arranged in series with, and downstream of, said first electrical continuously controlled valve CES1. Finally, the method comprises the step of decreasing SC4 the compression flow pressure by means of the first passive restricting valve 212, into the predefined low pressure level.

While the disclosure has been illustrated and described in detail in the drawings and foregoing description, such illustration and description are to be considered illustrative or exemplary and not restrictive; the disclosure is not limited to the disclosed examples. The skilled person understands that many modifications, variations and alterations are conceivable within the scope as defined in the appended claims.

In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to obtain an advantage. Any reference signs in the claims should not be construed as limiting the scope of the claims.

The invention claimed is:

1. A shock absorber for a vehicle, comprising:
   a damper body having an outer tube and an inner tube wherein the inner tube is arranged at least partly inside the outer tube,
   a main piston arrangement arranged in the inner tube dividing the inner tube into a first volume and second volume and configured to regulate a damping fluid flow between the first and second volumes,
   a first electrical continuously controlled valve fluidly connected to the first volume of the inner tube and configured to control the damping fluid flow during a compression stroke,
   a second electrical continuously controlled valve fluidly connected to the second volume of the inner tube and configured to control the damping fluid flow during a rebound stroke,
   a fluid reservoir for holding a pressurized gas, comprising a pressurizing piston separating the pressurized gas from the damping fluid and exerting a pressure on the damping fluid,
   a communication member arranged to fluidly connect the pressurizing piston with the low-pressure side of each of the first and second electrical continuously controlled valves, and
   a first passive regulating valve fluidly arranged between the pressurizing piston and one of the first or second electrical continuously controlled valves,
   wherein the fluid reservoir is co-axially arranged relative the damper body,
   wherein the first electrical continuously controlled valve and the second electrical continuously controlled valve are arranged in an active valve housing being radially displaced relative the damper body,
   wherein the communication member comprises a fluid communication chamber extending along the longitudinal extension of the active valve housing, so as to fluidly connect the first electrical continuously controlled valve, the second electrical continuously controlled valve and the pressurizing piston, and
   wherein the fluid communication chamber is arranged on a side of the active valve housing facing away from the damper body.

2. The shock absorber according to claim 1, further comprising:
   a second passive regulating valve arranged downstream of the other one of the first or second electronic continuously controlled valve and upstream of the pressurizing piston.

3. The shock absorber according to claim 1, wherein the fluid communication chamber is arranged externally of the damper body.

4. The shock absorber according to claim 3, wherein the fluid communication chamber is made of a die cast part or stamped sheet metal.

5. A shock absorber for a vehicle, comprising:
   a damper body having an outer tube and an inner tube wherein the inner tube is arranged at least partly inside the outer tube,
   a main piston arrangement arranged in the inner tube dividing the inner tube into a first volume and second volume and configured to regulate a damping fluid flow between the first and second volumes,
   a first electrical continuously controlled valve fluidly connected to the first volume of the inner tube and configured to control the damping fluid flow during a compression stroke,
   a second electrical continuously controlled valve fluidly connected to the second volume of the inner tube and configured to control the damping fluid flow during a rebound stroke,
   a fluid reservoir for holding a pressurized gas, comprising a pressurizing piston separating the pressurized gas from the damping fluid and exerting a pressure on the damping fluid,
   a communication member arranged to fluidly connect the pressurizing piston with the low-pressure side of each of the first and second electrical continuously controlled valves, and
   a first passive regulating valve fluidly arranged between the pressurizing piston and one of the first or second electrical continuously controlled valves,
   wherein the fluid reservoir is radially displaced relative the damper body,
   wherein the first electrical continuously controlled valve and the second electrical continuously controlled valve are arranged in an active valve housing being radially displaced relative the damper body,
   wherein the communication member comprises a fluid communication chamber extending along the longitudinal extension of the active valve housing, so as to fluidly connect the first electrical continuously controlled valve, the second electrical continuously controlled valve and the pressurizing piston, and
   wherein the fluid communication chamber is arranged on a side of the active valve housing facing away from the damper body.

6. The shock absorber according to claim 5, further comprising:
   a second passive regulating valve arranged downstream of the other one of the first or second electronic continuously controlled valve and upstream of the pressurizing piston.

7. The shock absorber according to claim 5, wherein the communication member is arranged as a connecting member arranged between the fluid reservoir and the active valve housing.

8. The shock absorber according to claim 7, wherein the communication member comprises an aperture extending along the longitudinal extension of the active valve housing, so as to fluidly connect the first electrical continuously controlled valve, the second electrical continuously controlled valve and the pressurizing piston.

* * * * *